(12) United States Patent
Chen

(10) Patent No.: US 9,085,128 B2
(45) Date of Patent: Jul. 21, 2015

(54) METHOD OF MANUFACTURING AN ENVIRONMENT-FRIENDLY TILE

(71) Applicant: DONGGUAN MEI JER PLASTIC PRODUCTS CO., LTD., Dongguan (CN)

(72) Inventor: Pen-Yuan Chen, New Taipei (TW)

(73) Assignee: DONGGUAN MEI JER PLASTIC PRODUCTS CO., LTD., Dongguan, Guangdong Province (CN)

( * ) Notice: Subject to any disclaimer, the term of this patent is extended or adjusted under 35 U.S.C. 154(b) by 288 days.

(21) Appl. No.: 13/900,345

(22) Filed: May 22, 2013

(65) Prior Publication Data

US 2013/0248108 A1    Sep. 26, 2013

Related U.S. Application Data

(62) Division of application No. 13/191,826, filed on Jul. 27, 2011.

(51) Int. Cl.
| | |
|---|---|
| B32B 5/02 | (2006.01) |
| B32B 3/10 | (2006.01) |
| B32B 27/06 | (2006.01) |
| B32B 27/10 | (2006.01) |
| C09J 5/06 | (2006.01) |
| B32B 27/40 | (2006.01) |
| B32B 37/10 | (2006.01) |
| E04F 15/10 | (2006.01) |

(52) U.S. Cl.
CPC . *B32B 37/10* (2013.01); *B32B 3/10* (2013.01); *B32B 5/02* (2013.01); *B32B 27/06* (2013.01); *B32B 27/10* (2013.01); *B32B 27/40* (2013.01); *C09J 5/06* (2013.01); *E04F 15/107* (2013.01); *Y10T 428/24851* (2015.01); *Y10T 428/24934* (2015.01); *Y10T 428/249925* (2015.04); *Y10T 428/31551* (2015.04); *Y10T 428/31554* (2015.04); *Y10T 428/31591* (2015.04)

(58) Field of Classification Search
CPC ........... B32B 3/10; B32B 5/02; B32B 27/06; B32B 27/10; B32B 27/40; B32B 37/10; C09J 5/06; E04F 15/107; Y10T 428/24851; Y10T 428/24925; Y10T 428/24934; Y10T 428/31551; Y10T 428/31554; Y10T 428/31591
See application file for complete search history.

(56) References Cited

U.S. PATENT DOCUMENTS

| | | | |
|---|---|---|---|
| 2008/0176039 A1* | 7/2008 | Chen et al. | 428/142 |
| 2011/0301260 A1* | 12/2011 | Kukreja et al. | 523/122 |

* cited by examiner

*Primary Examiner* — Gerard Higgins
*Assistant Examiner* — Sathavaram I Reddy
(74) *Attorney, Agent, or Firm* — Muncy, Geissler, Olds & Lowe, P.C.

(57) ABSTRACT

A new type environment-friendly tile and method of manufacturing the same, firstly, provide a multi bottom-fiber layer containing a environment-friendly water-borne resin; next, place a top wear-resistant layer made of thermoplastic polyurethane (TPU) on a top surface of said multi bottom-fiber layer, and perform hot pressing and lamination on them, so that said multi bottom-fiber layer is laminated and connected to said top wear-resistant layer utilizing said environment-friendly water-borne resin. The new type environment-friendly tile thus produced is not only light weight, and highly wear resistant, but its manufacturing method is also creative and innovative, and since it is made of environment-friendly material such as fiber and thermoplastic polyurethane (TPU), hereby realizing human health and environment protection requirements.

9 Claims, 7 Drawing Sheets

METHOD OF MANUFACTURING AN ENVIRONMENT-FRIENDLY TILE

CROSS-REFERENCE TO RELATED APPLICATIONS

This application is a Divisional of co-pending application Ser. No. 13/191,826, filed on Jul. 27, 2011, for which priority is claimed under 35 U.S.C. §120, the entire contents of which are hereby incorporated by reference.

BACKGROUND OF THE INVENTION

1. Field of the Invention

The present invention relates to a technology of manufacturing tiles, and in particular to a new type environment-friendly tile and method of manufacturing the same.

2. Brief Description of the Prior Art

Due to the needs of indoor decoration and the floor pavement, the placement of tiles on the floor is quite common. In general, the tile is designed to be the plastic tile made of ceramic or polyvinyl chloride (PVC), thus its price can be varied depending on material it is made and its size.

In the prior art, the ordinary plastic tile contains halogen, or volatile materials, that is not environment friendly. Moreover, in the past, the so called environment friendly plastic tile was made of Urea formaldehyde resin, modified melamine, or phenolic resin, etc containing various degrees of toxicity, and that does not conform to the requirements of human health. By way of example, in Taiwan Patent No 1280998 is disclosed a method of producing a plastic tiles having enhanced wear resistant surface, and the plastic tile is as shown in FIG. 1. The steps of manufacturing this kind of plastic tiles are as follows: firstly, prepare at least a polyvinyl chloride (PVC) bottom plate 10 and a surface glue layer 12, and glue them together, wherein, the surface of the surface glue layer 12 is pre-coated with a wear resistant glue, such that the side of the surface glue layer 12 not containing the wear resistant glue is glued to the PVC bottom plate 10; then upon the gluing the PVC bottom plate 10 and the surface glue layer 12 together, it is hot pressed and rolled into shape; and subsequently, cut it into the individual plastic tiles. From the descriptions mentioned above it can be known that, though the results of better wear resistance can be obtained, however, the PVC bottom plate still contains halogen, and that still poses hazard to the environment.

Therefore, presently, the design and performance of the tile of the prior art is not quite satisfactory, and it has much room for improvements.

SUMMARY OF THE INVENTION

In view of the problems and shortcomings of the prior art, the present invention provides a new type environment-friendly tile and method of manufacturing the same. It is quite a departure from the ordinary plastic tile manufacturing technology, and it is made of environment friendly material, such as water-bone resin, fiber layer, and thermoplastic polyurethane (TPU), that conform to the human health requirement. In addition, the high wear resistance and high slippery resistance of the thermoplastic polyurethane (TPU) can effectively increase the service life of the tile.

In order to achieve the above objective, the present invention provides a new type environment friendly tile, including: a multi bottom-fiber layer containing a first environment-friendly water-borne resin; and a top wear-resistant layer made of thermoplastic polyurethane (TPU), and is disposed on top of the bottom-fiber layer, such that the two types of layers are connected and laminated into shape.

Also, the present invention provides a new type environment-friendly tile manufacturing method, comprising the following steps: prepare a multi bottom-fiber layer containing first environment-friendly water-borne resin; then put a top wear-resistant layer made of thermoplastic polyurethane (TPU) on the top surface of the multi bottom-fiber layer; and subsequently, laminate and hot press these two types of layers to connect to each other and form into shape.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
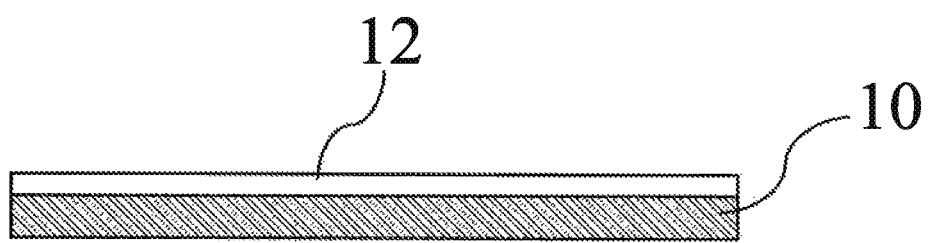
FIG. 1 is a cross section view of a tile according to the prior art.
Figure 2:
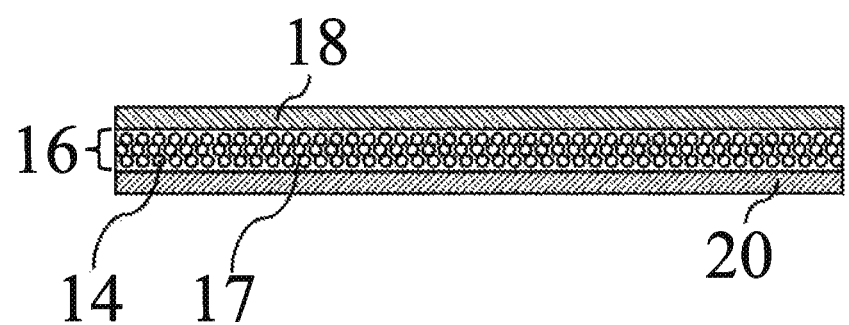
FIG. 2 is a cross section view of a tile according to a first embodiment of the present invention.

The present invention provides a new type environment-friendly tile. Refer to FIG. 2 for a cross section view of a new type environment-friendly tile according to a first embodiment of the present invention. As shown in FIG. 2, the environment friendly tile comprises: a multi bottom-fiber layer 16 containing a first environment-friendly water-borne resin 14, wherein, the multi bottom-fiber layer 16 includes a multi fiber layer 17 containing a first environment-friendly water-borne resin 14, and this multi fiber layer 17 is made of at least a paper layer, at least a wood layer, or at least a cork layer, or a composite layer of the paper layer, the wood layer, and the cork layer. For the first environment-friendly water-borne resin 14, the thermoplastic polyurethane (TPU) glue is taken as an example for explanation, and that includes: 25-50% polyurethane (PU) emulsion, 5-15% sodium stearate, 20-40% water, 1-10% glycerin, 0-10% polyvinyl alcohol (PVA). On the top surface of the multi bottom-fiber layers 16 is provided with a top wear-resistant layer 18 made of thermoplastic polyurethane (TPU), such that the multi bottom-fiber layer 16 utilizes the first environment-friendly water-borne resin 14 to connect to the top wear-resistant layer 18. Since the thermoplastic polyurethane (TPU) glue does not belong to the environment non-friendly resin of the prior art, besides, the way of using thermoplastic polyurethane (TPU) and the environment friendly material of multi-bottom fiber layers 16 is a departure from the conventional plastic tile manufacturing technology, thus it conforms to the requirements of human health and environment protection. In addition, the thermoplastic polyurethane (TPU) of top wear-resistant layer 18 is highly slippery-proof, and it wear resistance can be raised 5 to 10 times that of the ordinary polyvinyl chloride (PVC) material, hereby prolonging service life of the tile. On the bottom surface of the multi bottom-fiber layer 16 is provided with a bottom wear-resistant layer 20 made of thermoplastic polyurethane or Polyethylene (PE) to protect the multi bottom-fiber layer 16, such that the multi bottom-fiber layer 16 utilizes the first environment-friendly water-borne resin 14 to connect to the bottom wear-resistant layer 20.

In laying tiles on the ground, in case that the ground has a smooth surface plane already, then the bottom wear-resistant layer 20 can be omitted in achieving the same effect mentioned above.

Figure 3A:
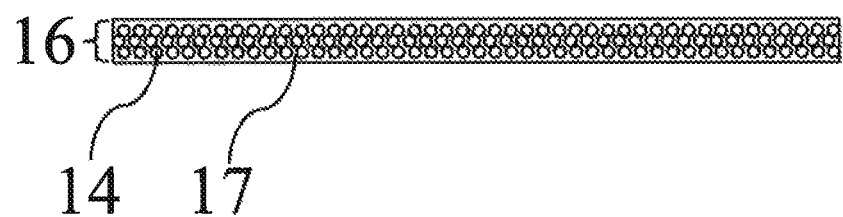
FIGS. 3(a) to 3(b) are the cross section views of a tile corresponding to the steps of manufacturing the tile according to the first embodiment of the present invention.
Figure 3B:
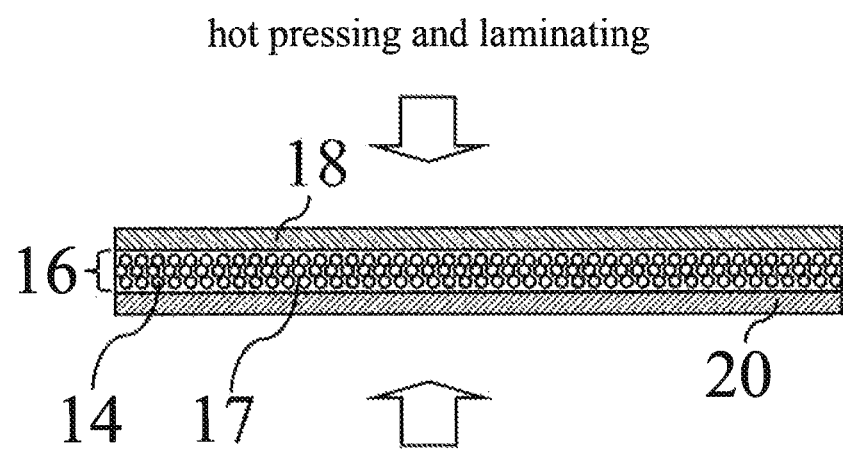

Then, the method of manufacturing tiles according to the first embodiment of the present invention is described. Refer to FIGS. 3(*a*) and 3(*b*) for the cross section views of a tile corresponding to steps of manufacturing the tile according to the first embodiment of the present invention. Firstly, as shown in FIG. 3(*a*), provide a multi bottom-fiber layer 16 containing the first environment-friendly water-borne resin 14. Next, as shown in FIG. 3(*b*), place the bottom wear-resistant layer 20, the multi bottom-fiber layer 16 containing first environment-friendly water-borne resin 14, the top wear-resistant layer 18 from bottom to top, then perform hot pressing and lamination, so that the bottom wear-resistant layer 20, top wear-resistant layer 18, and the multi bottom-fiber layer 16 containing the first environment-friendly water-borne resin 14 are laminated and connected to each other in completing the manufacturing processes.

In addition, in step of FIG. 3(*b*), the bottom wear-resistant layer 20 can be omitted, so that only the top wear-resistant layer 18 is placed on the top surface of the multi bottom-fiber layer 16, and then perform hot pressing and lamination, so that the top wear-resistant layer 18 is laminated and connected with the multi bottom-fiber layer 16 containing the first environment-friendly water-borne resin 14.

Figure 4A:
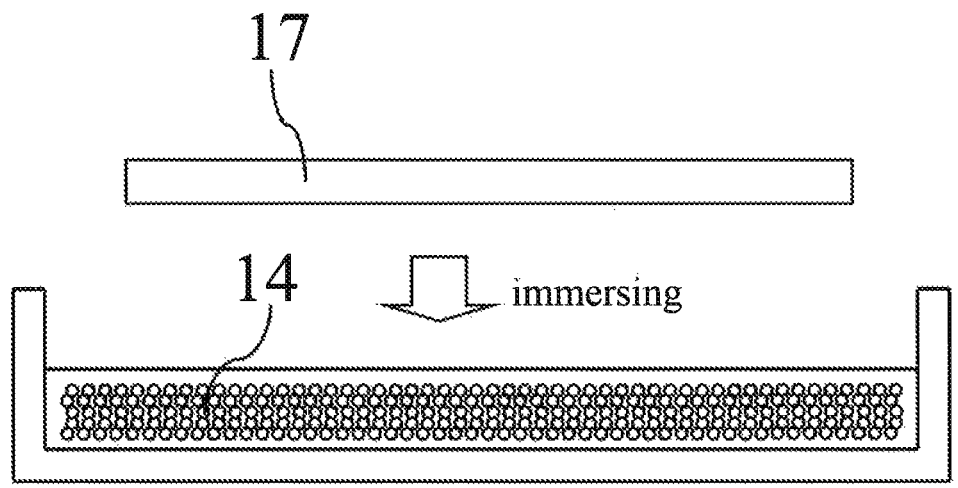
FIGS. 4(a) to 4(b) are the cross section views of a multi bottom-fiber layer corresponding to steps of manufacturing the multi bottom-fiber layer according to the first embodiment of the present invention.
Figure 4B:
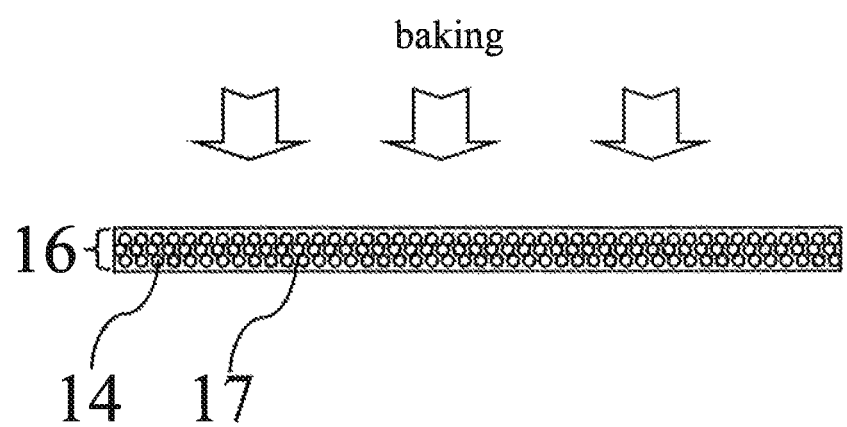

In the following, the method of manufacturing a multi bottom-fiber layer 16 is described, refer to FIGS. 4(*a*) to 4(*h*) for the cross section views of a multi bottom-fiber layer corresponding to steps of manufacturing the multi bottom-fiber layer according to the first embodiment of the present invention. Firstly, as shown in FIG. 4(*a*), immerse a multi fiber layer 17 into first environment-friendly water-borne resin 14 to absorb it. Next, as shown in FIG. 4(*b*), bake the multi fiber layer 17 to obtain a multi bottom-fiber layer 16, to proceed with subsequent processes of manufacturing.

Figure 5:
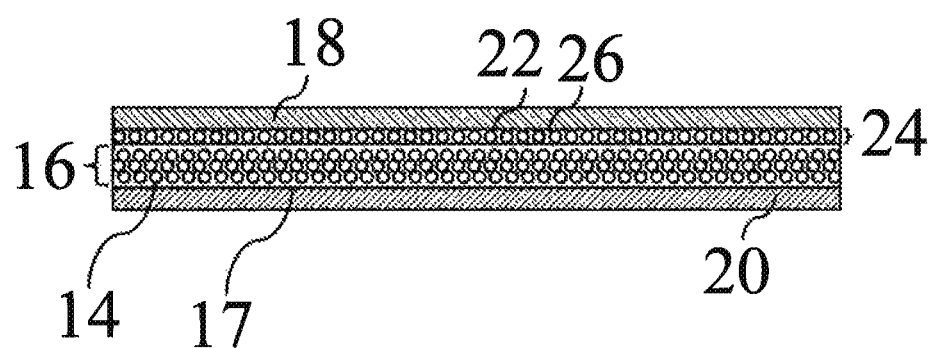
FIG. 5 is a cross section view of a tile according to a second embodiment of the present invention.

Subsequently, the second embodiment of the present invention is described, refer to FIG. 5 for a cross section view of a tile according to a second embodiment of the present invention. As shown in FIG. 5, the difference between the second embodiment and the first embodiment is that, an additional decoration fiber layer 24 containing the second environment-friendly water-borne resin 22 is added, that is disposed between the multi bottom-fiber layer 16 and top wear-resistant layer 18, so that the top wear-resistant layer 18, the decoration fiber layer 24 containing the second environment-friendly water-borne resin 22, and the multi bottom-fiber layer 16 are connected to each other. Wherein, the surface of the decoration fiber layer 24 further has a design pattern, and the decoration fiber layer 24 further includes an original fiber decoration layer 26 containing the second environment-friendly water-borne resin 22, such that the original fiber decoration layer 26 is a paper layer, a wood layer, or a cork layer. The compositions of the second environment-friendly water-borne resin 22 are the same as those of the first environment-friendly water-borne resin 14, and herein, the water-bone thermoplastic polyurethane (TPU) glue is taken as an example for explanation, and that includes: 25-50% polyurethane (PIT) emulsion, 5-15% sodium stearate, 20-40% water, 1-10% glycerin, 0-10% polyvinyl alcohol (PVA).

Similarly, in the second embodiment, the bottom wear-resistant layer 20 can also be omitted in achieving the same effect of environment protection, while keeping its high wear resistance.

Figure 6A:
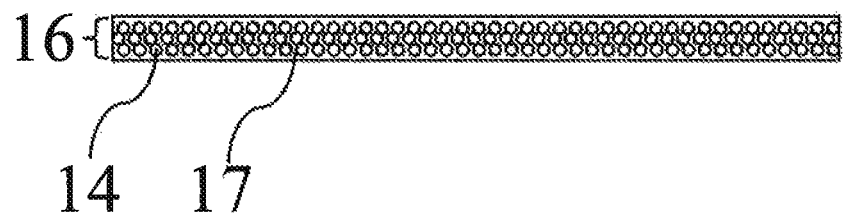
FIGS. 6(a) to 6(b) are the cross section views of a tile corresponding to steps of manufacturing the tile according to the second embodiment of the present invention.
Figure 6B:
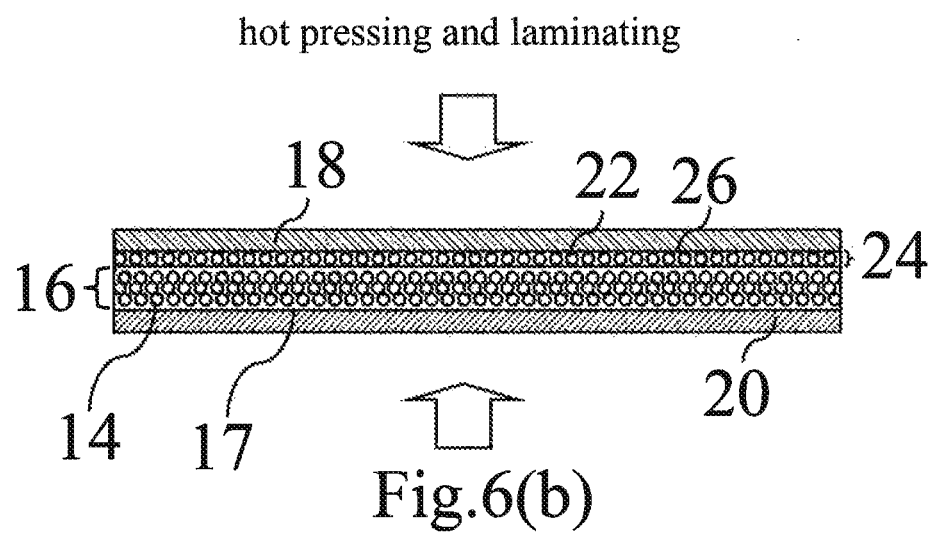

Subsequently, the method of manufacturing the new type of environment friendly tile of the second embodiment is described. Refer to FIGS. 6(*a*) and 6(*b*) for cross section views of a tile corresponding to steps of manufacturing the tile according to the second embodiment of the present invention. Firstly, as shown in FIG. 6(*a*), provide a multi bottom-fiber layer 16 containing the first environment-friendly water-borne resin 14; next, as shown in FIG. (b), dispose from bottom to top the following layers: the bottom wear-resistant layer 20, the multi bottom-fiber layer 16 containing the first environment-friendly water-borne resin 14, the decoration fiber layer 24 containing the second environment-friendly water-borne resin 22, and the top wear-resistant layer 18, and then perform hot press and connection, so that the top wear-resistant layer 18, the multi bottom-fiber layer 16 containing the first environment-friendly water-borne resin 14, the decoration fiber layer 24 containing the second environment-friendly water-borne resin 22, the bottom wear-resistant layer 20 are connected to each other, in completing the manufacturing of a tile of the present invention.

In addition, in the steps as shown in FIG. 6(*b*), the bottom wear resistant layer 20 can be omitted. Therefore, dispose from bottom to top only the following layers: the multi bottom-fiber layer 16 containing the first environment-friendly water-borne resin 14, the decoration fiber layer 24 containing the second environment-friendly water-borne resin 22, and top wear-resistant layer 18, and then perform hot pressing and connection, so that the top wear-resistant layer 18, the multi bottom-fiber layer 16 containing the first environment-friendly water-borne resin 14, and the decoration fiber layer 24 containing the second environment-friendly water-borne resin 22, are connected to each other to complete the manufacturing of a tile of the present invention.

Since the method of manufacturing a multi bottom-fiber layers 16 has been described in the first embodiment, as shown in FIGS. 4(*a*) and 4(*b*), so it will not be repeated here for brevity.

Figure 7A:
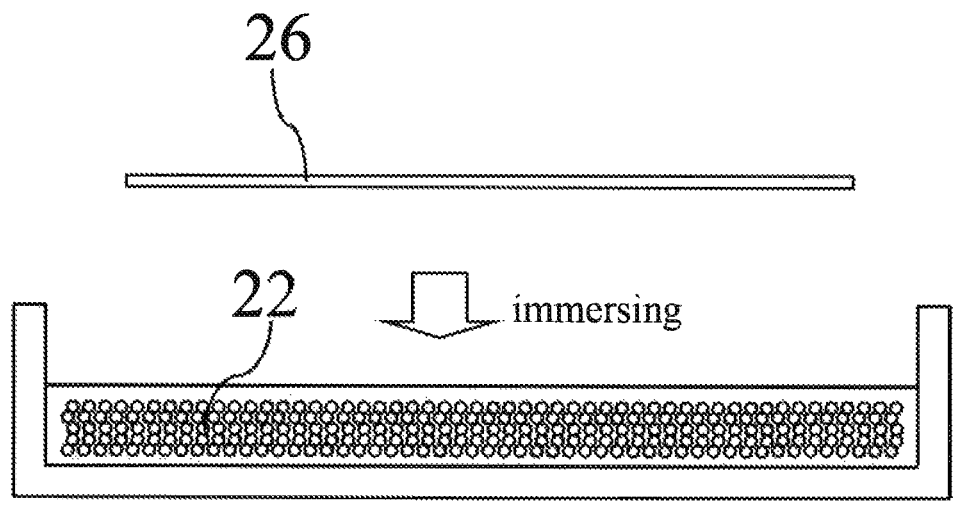
FIGS. 7(a) to 7(b) are schematic diagrams showing the steps of manufacturing a decoration fiber layer according to the present invention.
Figure 7B:
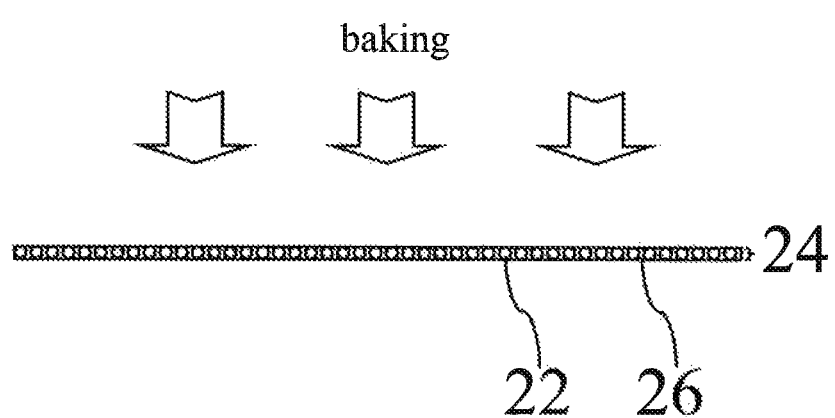

Finally, refer to FIGS. 7(*a*) and 7(*b*) for schematic diagrams showing the steps of manufacturing a decoration fiber layer 24 according to the present invention. Firstly, as shown in FIG. 7(*a*), immerse the original fiber decoration layer 26 into the second environment-friendly water-borne resin 22 to absorb it. Next, as shown in FIG. 7 (*b*), bake the original fiber decoration layer 26 to obtain the decoration fiber layer 24, for proceeding with the subsequent processes of manufacturing a tile.

Summing up the above, the present invention utilizes environment-friendly materials to fulfill the environment protection requirement, it further utilizes the characteristic of thermoplastic polyurethane (TPU) to fulfill the high wear resistance requirement of a tile.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A tile manufacturing method, comprising the following steps: providing a multi-fiber layer, having a top surface and a bottom surface, wherein said multi-fiber layer is made from a plurality of fibers and a first water-borne resin; wherein said first water-borne resin is a thermoplastic polyurethane (PTU) glue comprising 25-50wt % polyurethane (PU) emulsion, 5-15wt % sodium stearate, 20-40wt % water, 1-10wt % glycerin and 0-10wt % polyvinyl alcohol (PVA); and placing a wear-resistant layer made of thermoplastic polyurethane (TPU) on said top surface of said multi-fiber layer, and performing hot press and lamination, so that said wear-resistant layer and said multi-fiber layer are laminated and connected to each other.

2. The tile manufacturing method as claimed in claim 1, wherein the step of manufacturing said multi-fiber layer further includes steps of: immersing said plurality of fibers into said first water-borne resin to absorb said first water-borne resin; and baking said plurality of fibers to obtain said multi-fiber layer.

3. The tile manufacturing method as claimed in claim 2, wherein said multi-fiber layer further includes: at least a paper layer, a wood layer, or a cork layer, or a composite layer of said paper layer, said wood layer, and said cork layer.

4. The tile manufacturing method as claimed in claim 1, wherein said step of hot pressing and laminating said wear-resistant layer and said multi-fiber layer, so as to connect said wear-resistant layer and said multi-fiber layer further includes steps of: placing from bottom to top said multi-fiber layer, a decoration fiber layer containing a second water-borne resin, and said wear-resistant layer, performing hot pressing and laminating, so that said wear-resistant layer, said decoration fiber layer, and said multi-fiber layer are laminated and connected to each other.

5. The tile manufacturing method as claimed in claim 4, wherein said second water-borne resin is the same as said thermoplastic polyurethane (TPU) glue.

6. The tile manufacturing method as claimed in claim 5, wherein the step of manufacturing said decoration fiber layer includes the steps of: immersing an original fiber decoration layer into said second water-borne resin to absorb said second water-borne resin; and baking said original fiber decoration layer to obtain said decoration fiber layer.

7. The tile manufacturing method as claimed in claim 6, wherein said original fiber decoration layer is a paper layer, a wood layer, or a cork layer.

8. The tile manufacturing method as claimed in claim 1, wherein said step of hot pressing and laminating said wear-resistant layer and said multi-fiber layer, so that said wear-resistant layer and said multi-fiber layer containing said first water-borne resin are laminated and connected to each other includes the steps of placing from bottom to top a wear-resistant layer on said bottom surface of said multi-fiber layer, and said wear-resistant layer on said top surface of said multi-fiber layer and then performing hot pressing and laminating, so that said wear-resistant layer on said top surface of said multi-fiber layer, said wear-resistant layer on said bottom surface of said multi-fiber layer and said multi-fiber layer are connected to each other.

9. The tile manufacturing method as claimed in claim 8, wherein said wear-resistant layer on bottom surface of said multi-fiber layer is made of said thermoplastic polyurethane (TPU) or polyethylene (PE).

* * * * *